United States Patent [19]
Posso

[11] Patent Number: 5,114,089
[45] Date of Patent: May 19, 1992

[54] COMPONENT REEL WITH LATCHING DETENTS TO LOCK FLANGES TO HUB

[75] Inventor: Patrick Posso, Campagne de Pierraz-Portay, CH 1009 Pully, Switzerland

[73] Assignee: Patrick Posso, Pully, Switzerland

[21] Appl. No.: 557,795

[22] Filed: Jul. 26, 1990

[30] Foreign Application Priority Data

Aug. 2, 1989 [FR] France ................................ 89 10446

[51] Int. Cl.⁵ ...................... B65H 75/22; B65H 75/14
[52] U.S. Cl. ................................. 242/71.8; 242/118.6; 242/116
[58] Field of Search ...................... 242/71.8, 115, 116, 242/71.9, 118.6, 118.61

[56] References Cited

U.S. PATENT DOCUMENTS

| | | | |
|---|---|---|---|
| 1,679,573 | 8/1928 | Hind | 242/115 |
| 2,132,043 | 10/1938 | Oldham | 242/71.8 |
| 3,438,592 | 4/1969 | Posso | 242/71.8 |
| 3,822,841 | 7/1974 | Campbell | 242/115 |
| 3,848,310 | 11/1974 | Steinback | 242/71.8 |
| 3,861,614 | 1/1975 | Horak | 242/71.8 |
| 4,266,738 | 5/1981 | Nakagawa | 242/71.8 |
| 4,473,194 | 9/1984 | Kashimura | 242/71.8 |
| 4,893,764 | 1/1990 | Juntunen | 242/71.8 |

FOREIGN PATENT DOCUMENTS

| | | | |
|---|---|---|---|
| 570105 | 8/1977 | U.S.S.R. | 242/71.8 |
| 667467 | 3/1952 | United Kingdom | 242/71.8 |
| 2028272 | 3/1980 | United Kingdom . | |

Primary Examiner—Joseph J. Hail, III
Assistant Examiner—John Q. Nguyen
Attorney, Agent, or Firm—Dennison, Meserole, Pollack & Scheiner

[57] ABSTRACT

The reel includes two flanges and a hub. The hub has flexible latching blades extending tangentially inside housings, with alternate blades extending in opposite directions. The hub also includes locking bars in the housings for co-operating with hooks on the flanges. The locking bars are directed in two opposite directions with the bars extending in one direction co-operating with the hooks on one of the flanges, and the bars extending in the opposite direction co-operating with the oppositely-directed hooks on the other flange.

6 Claims, 2 Drawing Sheets

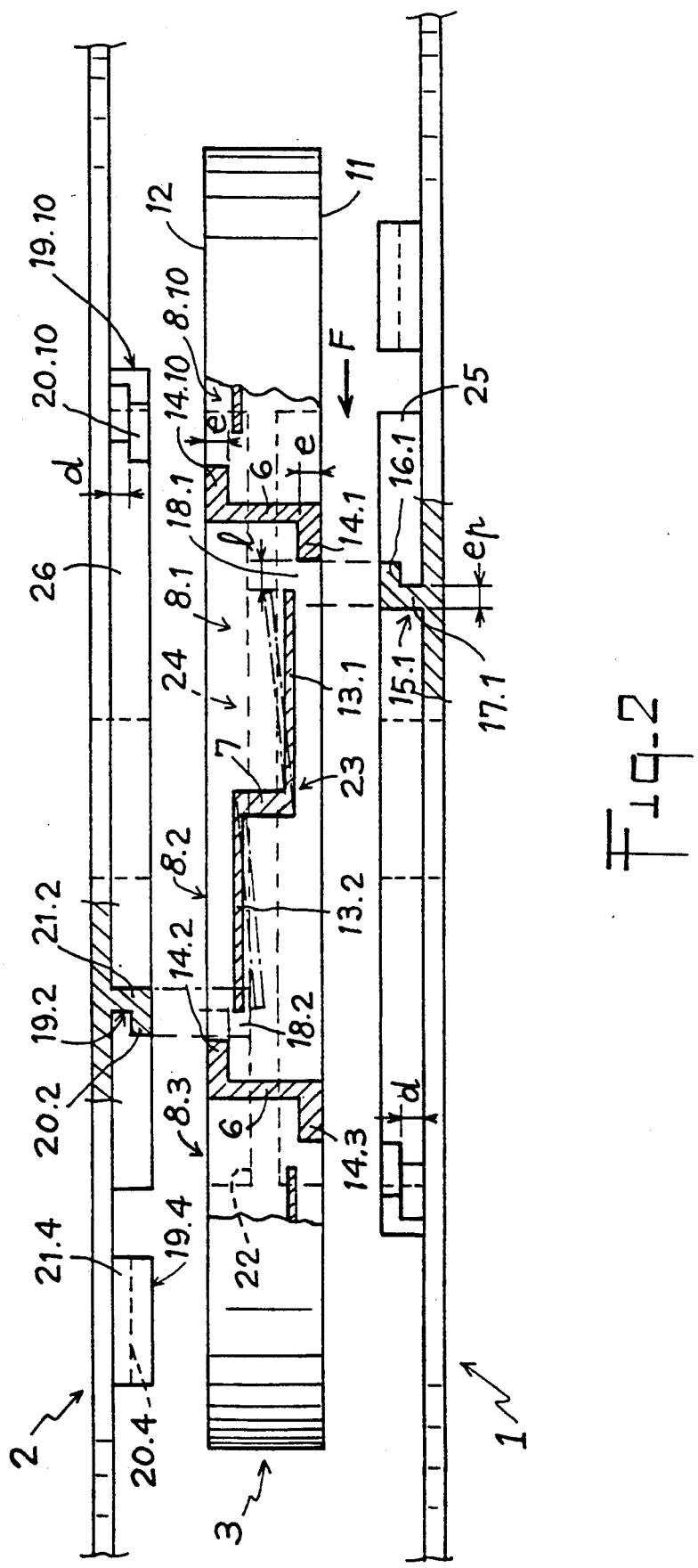

COMPONENT REEL WITH LATCHING DETENTS TO LOCK FLANGES TO HUB

The present invention relates to a reel for winding a tape, and more particularly tape for packaging electronic components.

BACKGROUND OF THE INVENTION

For storage and subsequent use, it is advantageous to insert electronic components in cells of a tape, to wind the tape filled in this way onto a reel, and to unwind it at the site where the components are used so that the components stored and protected in this way can be taken.

Such reels are known and they comprise a hub with two flanges, with the flanges being applied to axial end faces of the hub and being fixed thereto by complementary locking means. Naturally, the axial length of the hub depends on the width of the tape, which in turn depends on the size of the components. As a result, same-diameter reels of different widths are made up using the same flanges assembled to hubs of different lengths. This keeps down investment in tooling and reduces reel costs.

However, these known reels suffer from the following drawbacks. The molds for the flanges and the hubs are relatively complicated, and in order to make the locking means they require moving parts carrying inclined ramps called "cones". As a result the accuracy of the molded parts falls off as a manufacturing series progresses, not only because of mold complexity, but also because of "cone" wear. In addition to lack of locking accuracy, the presence of flash should be noted, as should the difficulty of assembling the flanges to a hub correctly, ensuring attractive appearance.

In addition, such reels cannot be taken apart after they have been assembled, and in some circumstances this can constitute a drawback, particularly when storage volume is to be reduced.

The object of the present invention is to improve the known reel in such a way as to remedy the above-mentioned drawbacks, while also eliminating the "cones", with molding difficulties being transferred to the flanges, and with the fixing points between the flanges and the hub being more numerous and in a substantially uniform distribution in order to improve the geometrical stability and rigidity of the reel.

SUMMARY OF THE INVENTION

To this end, the improvements of the invention lie:

in that the hub has flexible latching blades projecting in substantially tangential directions into housings opening out in each of the end faces of the hub, the deflectable free end of each flexible blade being separated from a locking element projecting into the corresponding housing by a gap which is substantially radial; and in that the flange to be fixed to an end face under consideration of the hub has as many complementary locking elements as the hub includes locking elements, the complementary locking elements being integral with the flange via shanks of thickness "ep" no greater than the width "l" of the gaps, and of height "d" substantially equal to the distance separating the bearing face of the hub from the locking elements, the complementary locking elements being cantilevered out from the shanks in the same direction as the flexible blades, extending over the locking elements of the hub and being in contact therewith when the flexible blades return resiliently to their rest positions after the hub and the flange have been brought together and rotated relative to each other, thereby latching against the shanks and preventing rotation in the opposite direction.

More particularly, each locking element is a flat locking bar projecting into the corresponding housing of the hub and extending substantially in alignment with the flexible blade of said housing, the complementary locking element being a complementary locking bar which together with its shank constitutes a hook projecting from the inside face of the corresponding flange.

The two flanges are identical and are mounted symmetrically, with the flexible blades of one of the end faces of the hub being directed in the opposite direction to the flexible blades of the other end face thereof, when observing the hub from the same end.

All of the housings open out into both end faces and are grouped together in pairs with two consecutive pairs of housings being separated by a Z-shaped radial partition whose limbs extend said faces and constitute the locking bars; and, the housings in each pair are separated from each other by a radial partition integral at one end with the flexible blade close to one of the end faces of the limb and at its other end with the flexible blade close to the other end face of the hub.

BRIEF DESCRIPTION OF THE DRAWINGS

An embodiment of the invention is described by way of example with reference to the accompanying drawings, in which:

FIG. 2 is a section on a larger scale on line II—II of FIG. 1.

DETAILED DESCRIPTION

Figure 1:
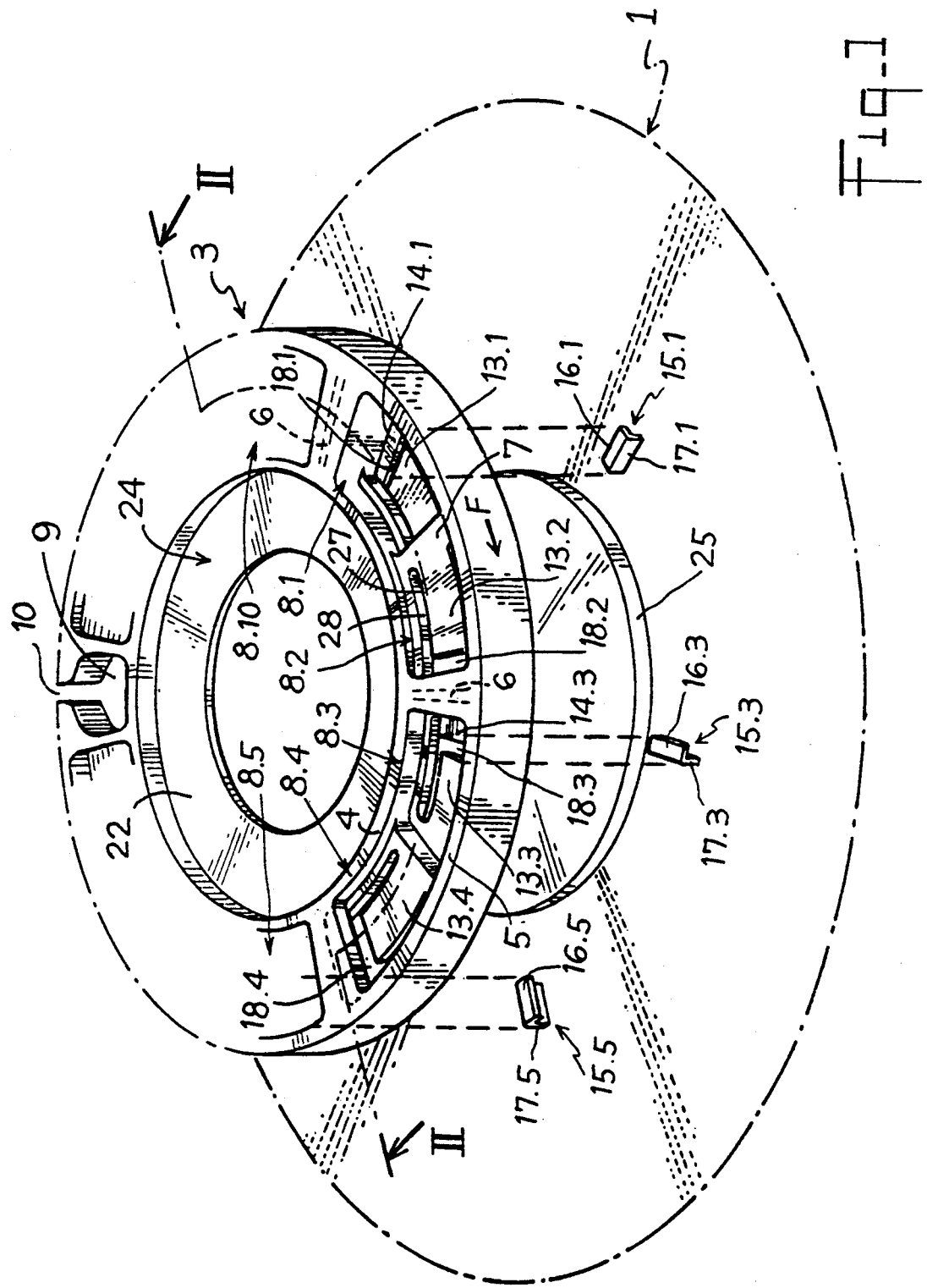
FIG. 1 is a perspective view on a scale larger than life size showing the portion of the reel which constitutes the improvement of the present invention.

As can be seen from the drawings, the reel is made of a plastic material such as impact polystyrene. It comprises two flanges 1 and 2 with a hub 3 interposed therebetween.

The flanges 1 and 2 are identical and manufactured in the same mold. However, they are assembled symmetrically.

The hub 3 is a single piece having two concentric rings 4 and 5 interconnected by "locking" partitions 6 and "latching" partitions 7, with the partitions 6 and 7 being substantially radial.

In the example shown, the partitions 6 extend over the entire axial length of the hub 3 while the partitions 7 extend over a fraction only of said length. Consecutive pairs of partitions 6 define respectives pairs of housings 8.1 and 8.2, with the housings in each pair being separated from each other by a partition 7.

In the present example, the hub has five odd numbered housings 8.1, 8.3, . . . 8. ($2n+1$) . . . 8.9 for co-operating with the flange 1 for fixing purposes, and five even numbered housing 8.2, 8.4, . . . , 8.2$n$ . . . 8.10 interposed between the preceding housings and intended to co-operate with the flange 2 for fixing purposes. These housings are uniformly distributed around respective end faces of the hub, except insofar as space is left for a notch 9 which opens out to the periphery of the hub via a slot 10 in which the end of the tape to be wound on the reel is inserted for engagement purposes.

The description below refers to the locking means implemented in housings 8.1 and 8.2, with the same locking means being provided in the other housings, irrespective of their number.

The latching partition 7 between housings 8.1 and 8.2 is integral with two flexible latching blades 13.1 and 13.2 extending across said housings along opposite tangential directions. The blade 13.1 is closer to the face 11 of the hub 3 that engages the flange 1, while the blade 13.2 is closer to the face 12 of said hub 3 that engages the other flange 2.

The locking partition 6 between the housing 8.1 and the housing 8.10 (FIG. 2) is integral:

with a complementary locking radial bar 14.1 projecting into the housing 8.1; and with a complementary locking radial bar 14.10 projecting into the adjacent housing 8.10, said partition 6 and the bars 14.1 and 14.10 together having a rectangular Z-shaped profile.

In the example shown in FIG. 2, the lower surface of the flexible blade 13.1 lies substantially in the same plane as the upper surface of the bar 14.1, and the lower surface of the bar 14.1 is coplanar with the face 11 of the hub. Naturally, the flexible blade 13.1 could be offset axially, providing it is capable of performing the function described below, namely of retracting by deflecting (to the position shown in dot-dashed lines in FIG. 2) in order to allow a locking hook 15.1 of the flange 1 corresponding thereto to pass and then latch against said hook by returning to its rest position (as shown in solid lines in FIG. 2). In addition, the lower surface of the bar 14.1 may be set back from the face 11, providing the bar is thick enough to withstand the locking action described below.

As shown in FIG 1 and 2, the flange 1 has five hooks 15.1, 15.3, 15.5, ... 15.2n+1 ... 15.9 on its inside face with the free end of each hook constituting a radial locking bar 16.1, 16.3, 16.5, ..., 16.2n+1, ... 16.9 suitable for co-operating with the complementary locking bar 14.1, 14.3, ..., 14.2n+1, ..., 14.9 of the hub 3. Each locking bar 16.2n+1 is connected to the flange 1 via an shank 17.2n+1 constituting the link limb of the hook 15.2n+1.

In addition, the free ends of the tangential flexible blades 13.2n+1 of the hub 3 are separated from the complementary locking radial bars 14.2n+1 also belonging to the hub 3 by radial gaps 18.2n+1.

Turning now to the hook 15.1 of the flange 1 and the gap 18.1 between the flexible blade 13.1 and the bar 14.1 of the hub, it is important to observe that the width "l" of the gap is at least equal (i.e. is equal plus a minimum amount of clearance) to the thickness "ep" of the shank 17.1 of the hook 15.1.

In order to mount the hub 3 on the flange 1, it therefore suffices:

to center the housings 8.2n+1 on the hooks 15.1 and to cause the hub to rotate in the direction of arrow F until the bars 14.2n+1 come into abutment against the bars 16.2n+1 of the flange 1 which is assumed to be stationary; then to press against the hub so that said hooks 16.2n+1 of the flange cause the blades 13.2n+1 of the hub to deflect; and finally to rotate the hub 3 in the direction of arrow F so that the bars 16.2n+1 of the flange 1 move over and against the bars 14.2n+1 of the hub 3 (FIG. 2) until the shanks 17.2n+1 of the flange come into abutment against the bars 14.2n+1, in which position the flexible blades are released and return resiliently to their rest positions, thereby latching against said shanks and thus preventiong the hub from being disassembled from the flange by being rotated in the opposite direction to arrow F.

In the same manner as described above for the locking partition 6 separating the housing 8.1 from the housing 8.10, the locking partition 6 separating the housing 8.2 from the housing 8.3 (FIG. 2) is integral:

with a complementary locking bar 14.2 projecting into the housing 8.2; and with a complementary locking bar 14.3 projecting into the housing 8.3, with the partition 7 and its bars 14.2 and 14.3 together having a profile in the form of a rectangular Z-shape.

The flange 2 includes as many hooks 19.2n as the hub 3 includes complementary locking bars 14.2n, which are suitable for co-operating with locking bars 20.2n formed by said hooks 19.2n of the flange 2 to which said bars are connected by shanks 21.2n.

In addition, the flexible blades 13.2n are set back from the bars 14.2n by gaps 18.2n of width at least equal to the thickness of the shanks 21.2n.

It is important to observe that because identical flanges 1 and 2 are mounted symmetrically, the bars 20.2n of the flange 2 project in the opposite direction to the bars 16.2n+1 of the flange 1 (FIG. 2), and the same applies to the flexible blades 13.2n of the hub 3 which point in the opposite direction to the flexible blades 13.2n+1 of said hub. As a result, in order to mount the hub 3 on the flange 2 which is assumed to be stationary and situated above the hub, it is necessary to rotate said hub in the opposite direction to arrow F after the two parts have been brought together.

As can be seen more clearly from FIG. 1, the inside ring 4 of the hub 3 is integral with a middle reinforcing ring 22 separating two recesses 23 and 24 for centering central separating two recesses 23 and 24 for centering central projections 25 and 26 on the flanges 1 and 2. The depths of the recesses are not less than the heights of the projections.

In addition, the free distance "d" between the flange 1 (or 2) and its bars 16.2n+1 (or 20.2n) is equal, ignoring necessary operating clearance, to the thickness "e" of the bars 14.2n+1 (or 14.2n) of the hub 3 so that during locking, the flanges 1 and 2 are pressed with appropriate clamping force against the end faces 11 and 12 of the hub 3.

FIG. 1 also shows that the rings 4 and 5 and the partitions 6 and 7 are integrally molded with circular reinforcing ribs 27 which are separated from the flexible blades 13 by slots 28.

It is clear that the flanges and the hub may be made using a minimum weight of plastic, and that in addition these parts can be molded without difficulty using simplified molds that do not include parts liable to wear by rubbing.

Naturally, the reel can be disassembled. When this is useful, it is necessary to provide holes (not shown) through the flanges 1 and 2 facing the free ends of the flexible blades 13, and also to provide an accessory having rods with the same spacing as said holes.

In order to disassemble the reel, the rods of the accessory are inserted into the holes of one of the flanges and pressed down in order to disengage the flexible blades 13, thereby releasing the shanks 17 and 21. The hub can then be rotated relative to the corresponding flange, thereby disengaging the bars 14 of the hub 3 from the bars 16 or 20 of the flange.

I claim:

1. A reel for winding a tape, and more particularly a tape having cells containing electronic components, the reel comprising two flanges connected to a winding hub by locking means, wherein:

the hub has flexible latching blades projecting in substantially tangential directions in housings opening out into each of the end faces of the hub, the deflectable free end of each flexible blade being separated from a locking element projecting into the corresponding housing by a gap which is substantially radial; and the flange to be fixed to an end face under consideration of the hub has as many complementary locking elements as the hub includes locking elements, the complementary locking elements being integral with the flange via shanks of a thickness (ep) no greater than the width (l) of the gaps, and of a height (d) substantially equal to the distance separating the bearing face of the hub from the locking elements, the complementary locking elements being cantilevered out from the shanks in the same direction as the flexible blades, extending over the locking elements of the hub and being in contact therewith when the flexible blades return resiliently to their rest positions after the hub and the flange have been brought together and rotated relative to each other, thereby latching against the shanks and preventing rotation in the opposite direction.

2. A reel according to claim 1, wherein each locking element is a flat locking bar projecting into the corresponding housing of the hub and extending substantially in alignment with the flexible blade of said housing, the complementary locking element being a complementary locking bar which together with its shank constitutes a hook projecting from the inside face of the corresponding flange.

3. A reel according to claim 2, wherein the two flanges are identical and are mounted symmetrically, with the flexible blades of one of the end faces of the hub being directed in the opposite direction to the flexible blades of the other end face thereof, when observing the hub from the same end.

4. A reel according to claim 3, wherein all of the housings open out into both end faces and are grouped together in pairs with two consecutive pairs of housings being separated by a Z-shaped radial partition whose limbs extend said faces and constitute the locking bars; and wherein the housings in each pair are separated from each other by a radial partition integral at one end with the flexible blade close to one of the end faces of the hub and at its other end with the flexible blade close to the other end face of the hub.

5. A reel according to claim 4, wherein each partition carrying an opposite pair of flexible blades is integral with two circular stiffening ribs molded together with two concentric rings of the hub co-operating with the partitions to delimit the housings, said ribs extending in the same planes as the flexible blades and being separated therefrom by slots.

6. A reel for winding a tape, and more particularly a tape having cells containing electronic components, the reel comprising two flanges connected to a winding hub by locking means, wherein:

the hub has flexible latching blades projecting in substantially tangential directions in housings opening out into at least one of the end faces of the hub, the deflectable free end of each flexible blade being separated from a locking element projecting into the corresponding housing by a gap which is substantially radial; and the flange to be fixed to said at least one of the end faces under consideration of the hub has many complementary locking elements as the hub includes locking elements, the complementary locking elements being integral with the flange via shanks of a thickness (ep) no greater than the width (l) of the gaps, and of a height (d) substantially equal to the distance separating the bearing face of the hub from the locking elements, the complementary locking elements being cantilevered out from the shanks in the same direction as the flexible blades, extending over the locking elements of the hub and being in contact therewith when the flexible blades return resiliently to their rest positions after the hub and the flange have been together and rotated relative to each other, thereby latching against the shanks and preventing rotation in the opposite direction.

* * * * *